United States Patent [19]
Levis et al.

[11] Patent Number: 5,884,991
[45] Date of Patent: Mar. 23, 1999

[54] LCD PROJECTION SYSTEM WITH POLARIZATION DOUBLER

[75] Inventors: Maurice E. Levis, Hampton, Va.; Helen Gourley, San Francisco, Calif.

[73] Assignee: Torch Technologies LLC, Hampton, Va.

[21] Appl. No.: 127,594

[22] Filed: Jul. 31, 1998

Related U.S. Application Data

[63] Continuation-in-part of Ser. No. 829,199, Mar. 31, 1997, Pat. No. 5,829,858, which is a continuation of Ser. No. 801,438, Feb. 18, 1997, abandoned.

[51] Int. Cl.⁶ .................................................. G03B 21/14
[52] U.S. Cl. .............................. 353/122; 353/20; 349/9
[58] Field of Search .............................. 353/20, 38, 102; 349/8, 9; 362/307, 308, 311, 326, 327, 328, 339, 268, 32; 385/11, 34, 133, 146, 901, 131, 130, 123; 359/894, 900, 503

[56] References Cited

U.S. PATENT DOCUMENTS

| | | | |
|---|---|---|---|
| 5,142,387 | 8/1992 | Shikama et al. | 353/122 |
| 5,513,023 | 4/1996 | Fritz et al. | 359/40 |
| 5,625,738 | 4/1997 | Magarill | 359/894 |
| 5,777,789 | 7/1998 | Lewis et al. | 385/133 |

*Primary Examiner*—William Dowling
*Attorney, Agent, or Firm*—Eliot S. Gerber

[57] ABSTRACT

A projector system includes a lamp, a reflector collector optic, a light pipe, a Polarizing Beam Splitter (PBS), and an LCD (Liquid Crystal Display) panel. The light pipe has a square or octagonal entrance pupil, reflecting internal walls coated with a cold mirror coating, is tapered in shape, and has a rectangular exit pupil. The PBS converts an unpolarized beam from the exit pupil of the light pipe into a uni-polarized beam which it directs to the LCD panel.

16 Claims, 5 Drawing Sheets

FIG.2

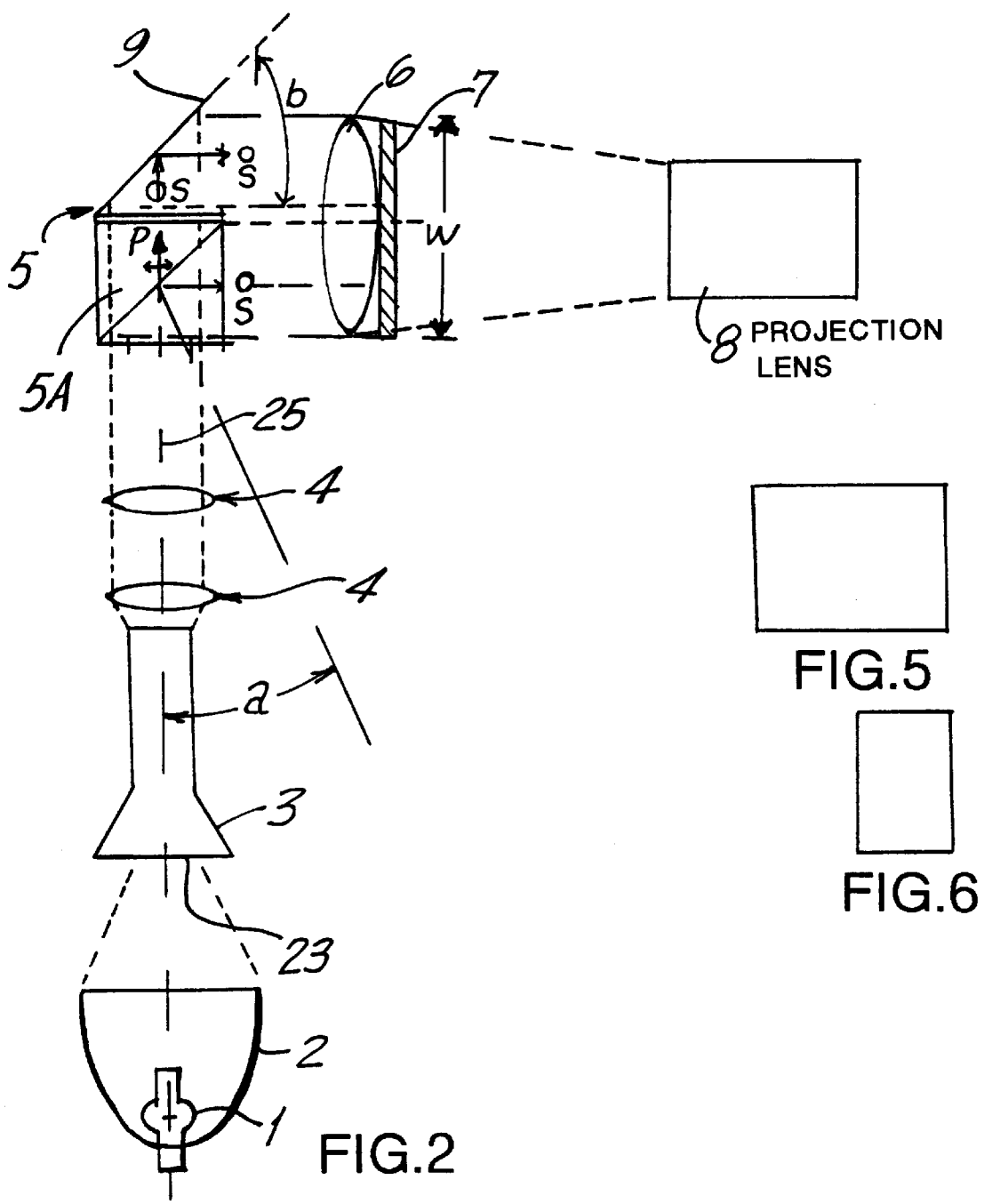

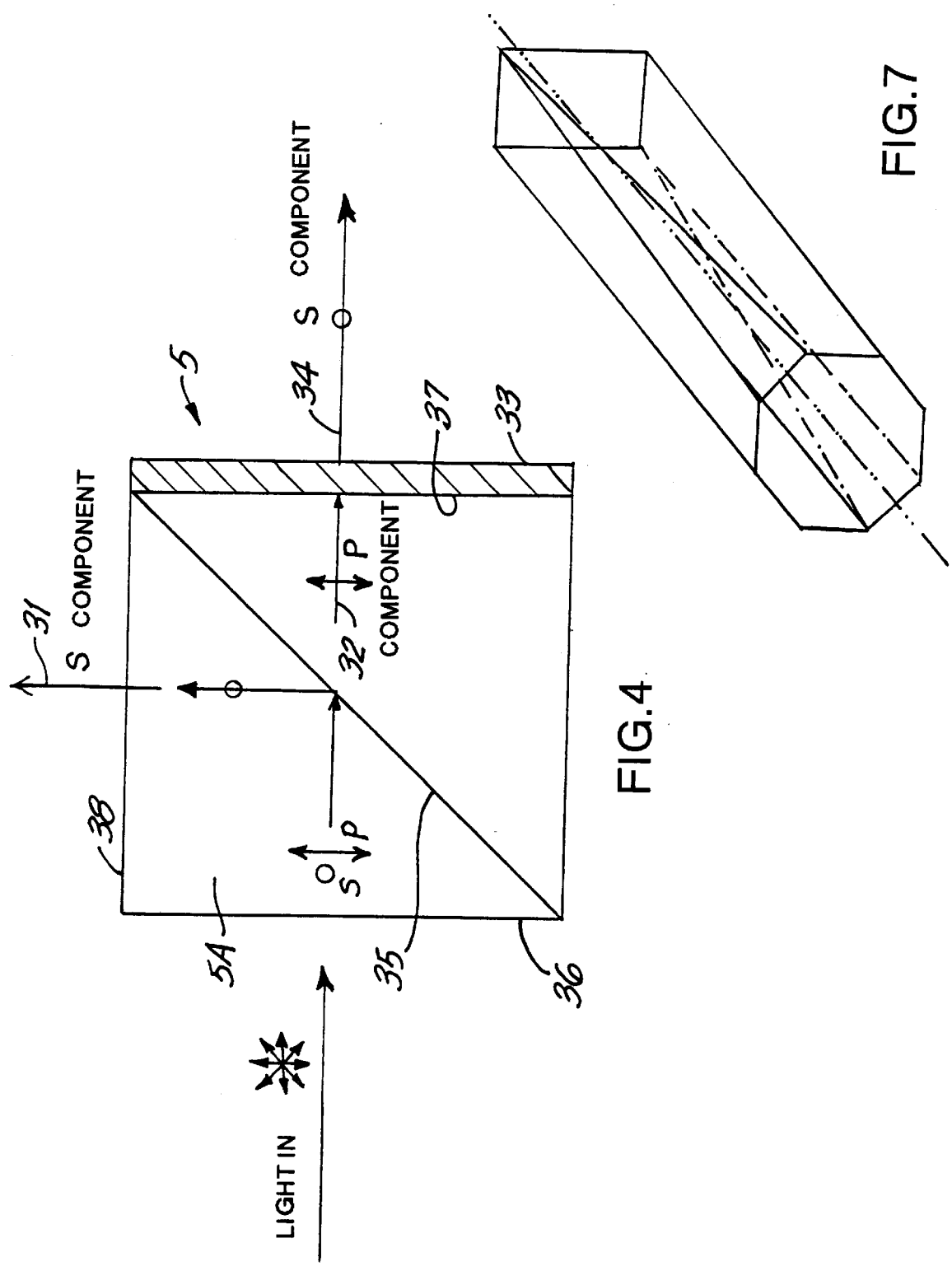

LCD PROJECTION SYSTEM WITH POLARIZATION DOUBLER

RELATED APPLICATIONS

This is a continuation-in-part application partly based upon application Ser. No. 08/829,199, filed Mar. 31, 1997, now U.S. Pat. No. 5,829,858, incorporated by reference, which is a continuation of application Ser. No. 08/801,438, filed Feb. 18, 1997, now abandoned, the priority dates of both applications being claimed herein; and is related to application Ser. No. 09/131,267, filed Aug. 7, 1998, now pending, entitled "Projector System With Hollow Light Pipe Optics."

FIELD OF THE INVENTION

The present invention relates to optical projection systems and more particularly to Liquid Crystal Display (LCD) projection systems commonly used for large screen television and for presentations.

BACKGROUND OF THE INVENTION

At the present time, Liquid Crystal Display (LCD) projection systems using LCD panels are widely used in large screen television (over 32 inches diagonal) and in stand-alone projectors controlled by a computer, such as a PC (Personal Computer). Such projection systems are widely used for presentation and entertainment by businesses, teachers and consumers.

In an LCD projector the light from the "light engine" is directed, by a lens system, through one, or three, LCD panels. A typical light engine consists of a light source, such as a metal halide arc lamp, a collector optic, such as an elliptical mirror reflector, and one or more lenses to direct the light onto the "image gate", which is the LCD panel (plate). It is desirable that the light engine have the following characteristics: (1) a bright, efficient light source; (2) low heat generation for effective cooling and to prolong the life of the lamp; (3) white light without blotching; (4) light spread evenly on the screen with the corners being at least 60% as bright as the center; and (5) physically small and low cost. The key to a good and low cost design is to maximize the efficiency of the throughput of the light emitted by the lamp. The more lumens on the screen, compared to the per watt of power of the lamp, the better the design. An active matrix LCD consists of tiny picture elements ("pixels") which are switched on and off. An organic fluid, called a "liquid crystal", is held between transparent plates. Generally the crystals are transparent but can alter the orientation of polarized light passing through them when the alignment of their molecules is changed by applying an electrical field across the crystals.

In a color LCD panel made of a single plate, the two outside faces of the transparent plate are coated with a polarizing filter (sheet polarizer) so that only P (parallel to plane of incidence) or S (perpendicular to plane of incidence) directed light waves may pass. Each full color pixel comprises a red, green and blue subpixel which has color filters so that only red, green or blue light is transmitted.

In a normally open panel, when no power is applied, light incident on the first polarizer is plane polarized along a chosen plane. The liquid crystals, with no power on, are aligned to twist the polarized light through 90°. The second polarizer/analyzer is set at 90° to the first one. In this manner, light is transmitted along a single polarization plane through the panel when there is no power on. Most LCD projection panels are of this type. When a pixel (or subpixel) is activated through the application of an electric field (power on), the polarized light will not be twisted by 90√ by the Liquid Crystal and will therefore be blocked by the second polarizer/analyzer.

The active matrix consists of one transistor for each subpixel, formed directly thereon, and the connecting printed wires. The wires are generally formed in column addressing lines and in row addressing lines.

The polarized light is derived from a non-polarized light source, such as a bulb. Due to the filtering, only one-half of the light output of the light source is utilized.

It is desirable, in many LCD projector systems, that all or most of the light be utilized. This would result in a brighter picture, using the same size of bulb. Alternatively, the bulb size may be reduced, which reduces the heat generated by the light engine. A smaller bulb may be cooler and may have a longer life. It has been a major goal in the LCD projection industry to develop ways to recover the part of the light in a projection system that is not polarized in the required polarization plane. Such light is lost from the projected beam. If successful, such a device, called a "polarizer doubler" will double the overall light efficiency of a projection system to greatly improve a projector's performance-to-cost ratio.

A number of prior patents and articles have suggested that the unpolarized light may be separated into two polarized beams, the polarization of one of the beams reversed and the two beams combined. That type of system is called a "polarizer doubler" as it doubles the amount of light available in one polarization. Such a polarizer doubler generally uses a Polarizing Beam Splitter (PBS) which separates light into its two polarizations.

In U.S. Pat. No. 4,913,529 to Goldenberg et al, an incident beam of unpolarized light is directed to a polarizing beam splitter (PBS) which reflects a beam of S-polarization (perpendicular to plane of incidence) and passes a beam of P-polarization (parallel to plane of incidence). The S-polarization beam is directed through a polarization rotator (half-wave retarder plate) which rotates the beam 90°. The two beams are then combined using a prism.

U.S. Pat. No. 5,601,351 and European Patent Application 0467-447-A1 to Brandt disclose a polarizer doubler for an image projection apparatus. It uses a polarization-sensitive beam-splitting prism and a polarization rotator which is a birefringent adhesive layer on a face of the prism. An optical integrator, positioned after the polarizer doubler, may include a "light guiding tube" (light pipe) whose entrance face is adapted to the cross-section of the beam emerging from the polarizing system and whose exit face is adapted to the shape and dimensions of the object to be illuminated. Brandt states that preferably the optical integrator is a first and second lens plate. Claim 1 of the U.S. Patent states that the polarizing system is between the optical integrator and the light source.

A portion of the prism and system of the Brandt patent is described in the article, DeVaan, Brandt et al, "Polarization conversion system LCD projection", *Euro-Display* 1995, pgs. 253–256.

U.S. Pat. No. 5,278,680 to Karasawa et al discloses a polarizing beam splitter (PBS) between the light source and the LCD plate. A polarization conversion device (polarizer rotator) converts the polarization of one beam. The two beams are reflected by mirrors and are superimposed, in one embodiment, in a prism to form a single beam. FIGS. 11 and 12 show a cube prism used to reflect one polarization and transmit the other polarization.

In U.S. Pat. No. 5,513,023 to Fritz a polarizing doubler transmits light from a light source to PBS using two fiber bundles (fiber optic cable) and collimating lenses.

Other polarizer-doubler systems for LCD panels are disclosed in U.S. Pat. No. 4,798,448 to van Raalte; U.S. Pat. No. 5,566,367 to Mitsutake et al.; U.S. Pat. No. 5,653,520 to Kato; U.S. Pat. No. 5,485,310 to Inada; and U.S. Pat. No. 4,702,557 to Beckmann and in the following articles: Nicholas et al., "Efficient Optical Configuration for Polarized White Light Illumination of 16/9 LCDs in Projection Display", *Japan Display* '92, pgs. 121–124; Shikama et al., "A Polarization Transforming Optics For High Luminance LCD Projector", *Japan Display* '93, pgs. 26–29; Imai et al., "A novel polarization converter for high-brightness liquid crystal light valve projector", *Euro Display* '93, pgs. 257–260 and *Japan Display* '93, pgs. 235–237.

U.S. Pat. No. 5,625,738 does not relate to a polarizer doubler. In FIGS. 2a–3 it shows a light tunnel (light pipe) which is tapered for a projection system.

The above-cited patents and articles are incorporated by reference.

SUMMARY OF THE INVENTION

The present invention provides a unique and effective light engine, having a polarizer doubler, for an LCD projection system. The light incident on the LCD image gate is linearly polarized along a selected polarization axis.

A typical prior art "light engine" shown in FIG. 1 consists of the following components: a light source (bulb) 10, a collector optic (reflector) 11, lenses 13 and/or mirrors to direct the light beam 14 through the Fresnel lens 18 and LCD image gate 15. The beam 14 is then directed through a projection lens 16 onto a screen 17 where the image formed by the LCD is projected. In the system of FIG. 1, the initial randomly polarized light beam is divided into two equal beams polarized at 90° to each other. The one beam that is polarized in the preferred direction is directed through the LCD and projected onto the screen. The other beam is deflected out of the path and lost.

The present invention provides a novel and efficient means of rotating the rejected linearly polarized beam by 90°. Its polarization axis is oriented in the same direction as the polarization axis of the selected beam. The two beams are then joined in a side-by-side rotation (not superposition of beams). The present invention, in effect, collects the entire initial beam (less reflective and transmissive losses) and directs it through the LCD image plane (LCD image gate) and further onto the screen.

The present invention combines a conventional light source (lamp), a collector optic (reflector), a Light Pipe Integrator (LPI) and relay optics with a Polarizing Beam Splitter (PBS) optical element and beam recombination optics. It generates a single beam consisting of side-by-side beams both of which are of light linearly polarized in the single preferred direction.

The collector optic can be nominally an elliptical reflector but preferably is a compound collector, consisting of two or more eccentricity zones and two or more focal points, that is matched to the LPI optical element. The LPI is not a bundle of optic fibers or a solid glass rod but is a hollow pipe with reflective walls. The PBS optical elements are sensitive to the light beam cone angle and perform best at low cone angles, under 5° half cone, and preferably under 3°.

There are unique major advantages in using an LPI in the present invention, namely: (1) The beam cross-sections are, to begin with, shaped appropriately for the particular aperture at the image gate, which is rectangular. That is, a rectangular beam is propagated, making the beam addition or recombination much more efficient and optically easier to accomplish; (2) The collector/LPI combination can be designed to minimize the cone angle of the beam of light incident on the PBS, thus enhancing the PBS's performance; (3) This optical approach will reduce cost and size of the light engine. These three factors combine to make the light throughput for the projection system more efficient. The gain due to the polarizing doubler of the present invention is close to a factor of two.

The light pipe integrator (LPI) functions on the principle of internal reflection. It is with mirror interior walls (internal reflection) and is not a solid piece of glass or other transparent material (total internal reflection). The entrance pupil (entrance face) of the light pipe receives the conical beam from the collection optic (reflector). The entrance pupil is flat, round, square, round or octagonal in a cross-section perpendicular to the optical axis, to best match the truncated cone shape of the light beam. The term "profile" means in a plane through the optical axis and the term "cross-section" means in a plane perpendicular to the optical axis. The exit pupil (exit face) of the light pipe is flat in a cross-section and has the shape one-half of the width, or height, of the aspect ratio of the rectangular image gate, for example, the LCD panel. This aspect ratio is typically 4:3, although other aspect ratios may be utilized, such as HDTV's (High Definition Television) image gate aspect ratio of 9:16.

The light pipe integrator integrates the colors from the arc lamp and produces a homogenized, uniform color temperature of white light at its exit pupil. The light pipe also provides a rectangular exit face that may exactly fit the input face of a Polarizing Beam Splitter (PBS) (aspect ratio and shape), thus substantially reducing the amount of light lost in spillage. The light pipe gives an excellent distribution of light over the input face of the PBS. The light engine consequently produces a beam at the image gate, easily resulting in corner illuminance (ANSI) of 70% of center, which is a major image quality enhancement over presently commercially available light engines. The light pipe, and the multiple-ellipse reflector (collector optic), called "VAREX" (TM of Torch Technologies LLC), improves color uniformity, light uniformity and collection efficiency.

The cone angle distribution ("angle population") of the incoming light cone from the light source sets the cone angle distribution of the outgoing cone. It is desirable that the outgoing beam cone angle population be reduced. The goal is to match the required angle population of the image gate, i.e., the LCD. The preferred shape of the light pipe (LPI) is composed of an entrance tapered section, a narrow center section and an exit tapered section. The wide part of the taper of the exit tapered section is toward the PBS. The entry tapered section has the wide part of the taper facing the light source. Such a double tapered light pipe produces a reduction in the angle population of the outgoing beam cone to at least 80% of the light having cone angles below 10° (half-cone), and reduces the geometric extent, which results in the reduction of the physical length of the light engine.

A preferred embodiment of a light pipe LPI is a hollow light pipe with a two tapered section shape, an entry pupil, a center section, which is square or round in cross-section, and a flat rectangular exit pupil. Preferably the walls of the light pipe are flat, formed of a low expansion glass and coated with a cold mirror coating.

The collector optic is formed as a continuous mirror curved surface. That surface comprises two, or more, ellipses having different eccentricities (e) and focal points (F) and possibly tilted with respect to their optical axis. The ellipses are cross-sections in planes through the reflector's optical axis; but cross-sections of the reflector perpendicular to its optical axis are circles.

BRIEF DESCRIPTION OF THE DRAWINGS

In the accompanying drawings of the present invention, the figures are described as follows:

FIG. 2 is a cross-sectional view of the system of the present invention exemplifying the use of its novel optics to provide a polarization doubler;

FIG. 4 is a side view of a PBS, ½ wave retarder assembly;

FIG. 5 is a cross-sectional view of the doubled beam on the LCD plate having an aspect ratio of W:H;

FIG. 6 is a cross-sectional view of the beam as it exits the exit pupil of the LPI and having an aspect ratio of W/2:H;

FIG. 7 is a perspective view of an LPI having an octagonal entry pupil and a rectangular exit pupil with an aspect ratio of W/2:H;

DETAILED DESCRIPTION OF THE INVENTION

Figure 1:
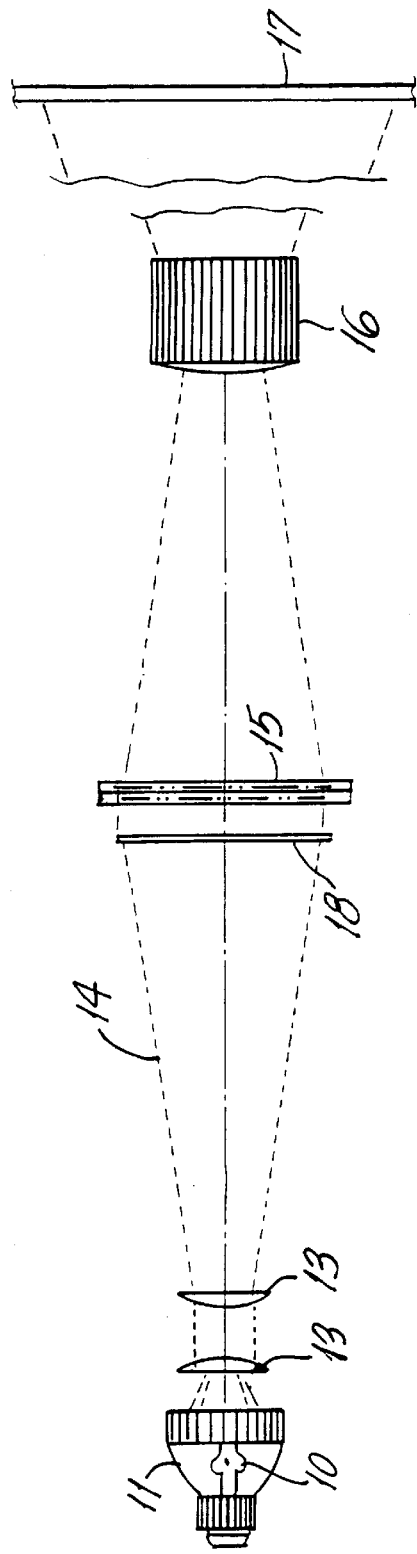
FIG. 1 is a cross-sectional view of a prior art LCD projector system.

In FIG. 2 of the present invention a "light engine" is shown incorporating a Light Pipe Integrator 3 (LPI) and a Polarizing Beam Splitter 5 (PBS). It is a "polarizer doubler" as it doubles the polarized light intensity at the image gate. Light from the lamp 1 (light source) is collected by the collector optic 2 (reflector) and concentrated onto the entrance pupil 23 of the LPI 3. The LPI 3 transmits the beam of light from its entrance pupil 23 to its exit pupil 26 via multiple reflections. The light exiting the LPI exit pupil and PBS is collected by the relay optics 4 (convex-convex lenses) that forms the image of the exit pupil of the LPI onto the image gate, e.g., the LCD plate 7. The LPI exit pupil is rectangular and, in aspect cross-section, is half the aspect width W of the rectangular LCD plate. In FIG. 7 W indicates that width, e.g., this view shows LCD plate 7 on its side.

A light pipe integrator (LPI) is an elongated optical element having an entrance pupil, reflecting internal walls and an exit pupil. Light entering the entrance pupil is internally reflected to become homogenized (mixed). The LPI is preferably hollow with internal mirror walls. Alternatively, the light pipe may be a solid transparent member of optical glass or plastic whose outside walls should not be mirrored because it would lose its total internal reflective property. The solid light pipe is held in place by knife edge or plastic screw supports and covered (not touching) by a sheath, for example, a sheet metal sheath. The supports may be transparent screws mounted in the sheath whose points hold the light pipe in position.

The entrance pupil 23 is preferably square, cone-shaped or hemispherical (if solid LPI) or flat and round or rectangular (if hollow LPI) in a cross-section vertical to the optical axis 25 to accord with the shape of the light beam cone. If the LPI is solid the beam cone is truncated perpendicular to its axis of rotation in the case of a flat entrance pupil. The light pipe exit pupil 26 is flat and rectangular (cross-section perpendicular to optical axis) and one-half the width of the aspect ratio of the image gate, typically for LCD panels having Width:Height of 4:3 it has an aspect ratio of 2:3.

Preferably the light pipe section closest to the LCD panel is tapered so that the exit pupil is at least 20% larger (in area) than the center section of the light pipe and the light pipe becomes larger (in cross-sections perpendicular to its optical axis) towards its exit pupil, i.e., toward the LCD plate). This tapered shape permits an efficient transmittal of the light without wasting light, due to spillage, at the LCD plate. Preferably the ratio of the entrance pupil area to exit pupil area is in the range of 1.5:1 to 5:1 and most preferably in the range of 2:1 to 4:1. Preferably the cross-sectional area of the exit pupil is at least 20% greater than the cross-sectional area of the center section.

Hollow LPIs are preferred to solid transparent LPIs for a number of reasons. Costs are reduced because the hollow LPI may use flat, reflective coated material that is mechanically easy to assemble and integrate into the "light engine" system. There are no problems with entrance and exit pupil losses (no AR anti-reflective coatings needed), or heating of the glass substrate. Low expansion borosilicate glass is preferably used as a reflector substrate (the base for the internal reflective walls). The light travels through empty air space, thus no scattering or other interference occurs.

The internal reflective coating is preferably a cold mirror coating to remove infra-red light (IR heat) from the light beam and to reflect visible light. This cold mirror coating (a multilayer or dielectric coating) in an LPI makes the angle of incidence dependence of the coating not critical. One of the major properties of the LPI is the "homogenizing" of the colors within the LPI, so by the time the beam exits from the LPI the various colors are well mixed and color uniformity is excellent.

A preferred LPI configuration is a hollow LPI using highly reflective mirror coatings on its internal walls deposited on low expansion glass. Such a coating is the OCLI HR97C, an enhanced aluminum mirror coating with 97% reflectivity. A preferred coating is a cold mirror coating that allows the heat rays (IR) to be transmitted, while reflecting the visible rays. Such a coating is the OCLI HR98A coating made of layers of thin film dielectric material with a reflectivity in the visible part of the spectrum an average of 98.5%.

Figure 8:
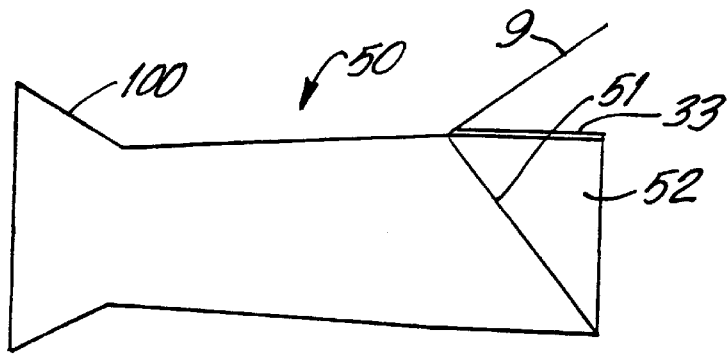
FIG. 8 is a cross-sectional view of an embodiment using a solid LPI.

A preferred hollow LPI shape has an octagonal or square and flat (cross-section) entrance pupil, with a tapered first section ending in a square (cross-section). That square is attached to a second section (center section) with a rectangular cross-section (10 mm×10 mm) and a larger exit pupil cross section (exit section) to match the shape of the PBS, as shown in FIG. 8. The overall length is 106 mm and the entrance pupil is 28 mm×28 mm square and the exit pupil is 18 mm high and 12 mm wide.

The LPI changes the cone angle of the angle population between the incoming beam and of the outgoing beam. The "angle population" is the average amount of light at each angle to the optical axis, i.e., if the light is 80% at angles less than 6 degrees it has a low angle population. This function, of changing the angle population, is performed by the tapered geometry of the LPI. This is important because the LCD panel angle population acceptance angle is rather limited (under 10 degrees). The tapered shape of the LPI reduces the maximum angle of the incoming angle population and produces an outgoing light beam having a low angle population (at least 80% is under 10 degrees).

Figure 3:
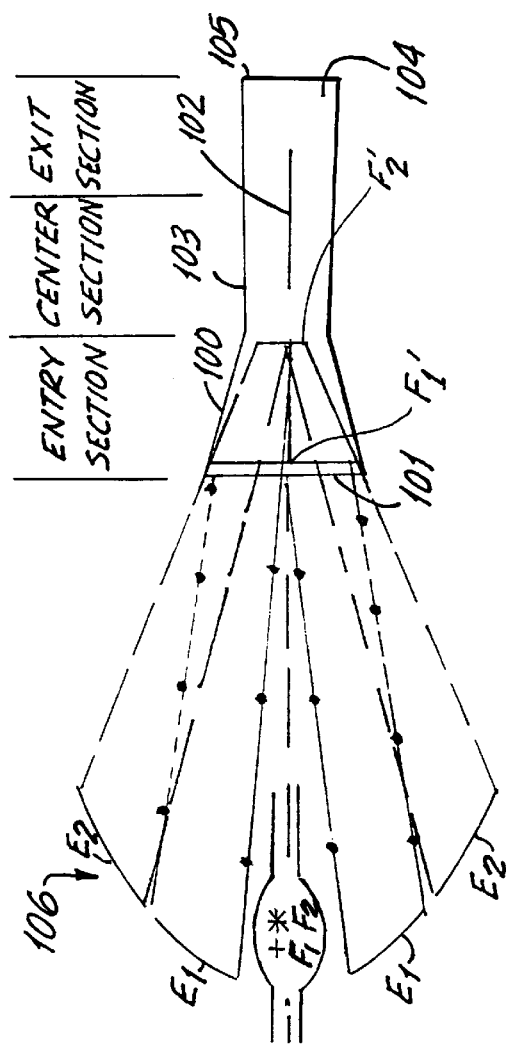
FIG. 3 shows an optical system consisting of a multi-eccentricity, multi-focal aconic collector (reflector) matched to a variable cross-section LPI.

FIG. 3 shows the most preferred embodiment of the LPI. The entry section 100 starts with the entry pupil 101. The entry pupil is flat (cross-sectional perpendicular to optical axis 102) and is preferably square and may be round or octagonal. This LPI is hollow and constructed from flat glass mirrors. The entry section is tapered in shape with the larger portion toward the light source (left in FIG. 3). In the prototype the entry pupil cross-section is square, but an octagonal cross-sectional entry pupil is also preferred, as shown in FIG. 7. The entry pupil area (cross-section) is in the range of 1.5:1 to 5:1 and most preferably in the range of 2:1 to 4:1, to the smallest area cross-section (perpendicular to axis 102) of the center section 103. The exit section 104 is also tapered and the exit pupil 105 is flat and rectangular (cross-section). The center section 103 is integral with the exit section 104. In the embodiment of FIG. 7, the entry pupil profile is flat and octagonal, and the entry section transitions to a square flat which is connected to the center section.

In the embodiment of FIG. 3, the entry section 100 is 22 mm long. This embodiment is made of two pieces. At their connection they are both square (10 mm×10 mm). The second taper (center section and exit section) is 85 mm long and goes from square cross-section (10 mm×10 mm) to rectangular (12 mm×18 mm–21 mm diagonal) to match the aspect ratio of the input face of the PBS. Its total length is 106 mm. This is a "V-BLOCK" (TM) LPI.

FIG. 6 shows the cross-section of the beam as it exits the exit pupil of the LPI 3 of FIG. 2. FIG. 5 shows the cross-section beam as it enters the field lens 6. The field lens 6 directs the beam onto the rectangular LCD plate 7 and is passed through plate 7 to the projection lens 8. The width of the beam is doubled as it passes through the PBS cube 5. PBS cube 5, in FIG. 2, is a half-wave retarder and mirror assembly comprising solid cube 5A and mirror 9. Both halves of the beam are converted to S-polarization.

As shown in FIG. 2, there is a small gap in the center of the light beam directed and imaged on the image gate. This gap can be eliminated by slightly tilting the PBS cube 5A through a small angle "a" using rotation and/or tilting independently the mirror 9 attached to the PBS cube 5A through rotation of angle "b". Rotation of the PBS cube 5A must be performed while simultaneously all optics along that axis are rotated so that the optical axis alignment between the lamp, collector, LPI, relay optics and PBS is maintained. The image of the LPI exit pupil formed on the image gate is made of two halves generated by the PBS half-wave plate, mirror assembly. These two halves can be adjusted to have any amount of overlap desired. If the overlap is too bright, it can be diffused using a strip of neutral density filter between the overlap and the field lens 6.

The collector optic 2 is nominally an elliptical reflector. Preferably, however, it is an aconic or compound reflector. The options are severely limited due to the requirement for achieving maximum light transfer between the collector and the light pipe entrance pupil.

The shape of the reflector (concave mirror) which gathers the light from the lamp and directs it at the entry pupil of the light pipe is preferably curved with two elliptical sections. It is a concave reflector whose back end (closed end) is formed as an ellipse having a first eccentricity E(1) and secondary focal point $F_1'$ and whose front end (open end) is an ellipse having a second (and different) eccentricity E(2) and secondary focal point $F_2'$. This variable ellipse reflector does not form a sharp image (point or line focus) at a focal point, since it is not used to form an image. Instead, it forms a fuzzy ball of light located at, or within, the entrance pupil of the tapered light pipe. The internal mirrored reflecting surface is a nonspherical continuously curved surface having two, or more, difference generators of curvature (preferably ellipses) and in which the cross-sections are circular (perpendicular to the optical axis of the cone of light).

An example of a highly efficient lamp, collector, LPI system assembly is given in FIG. 3. In FIG. 3 a dual eccentricity, dual focal length compound collector optic 106 is used to maximize light collection in the LPI entrance pupil. The collector optic 106 (reflector) is metal with a mirror interior finish. The lamp bulb 107 is a plasma arc bulb having an arc gap in the range of 1–6 mm, for example, HTI 404W/SE by OSRAM (400 watts, gap 3.0 mm, 30000 lumens). The light source may be a xenon arc lamp or an incandescent bulb such as a halogen bulb. The higher eccentricity is used for the back end of the collector to reduce image size for the low angle collected light. The lower eccentricity is used on the open end to reduce the cone angle of the collected light. The two beams are focused at different points. The primary focal points $F_1$ and $F_2$ are within the bulb. The secondary focal points $F_1'$ and $F_2'$ are within the LPI. For example, E(1) is 0.710 and E(2) is 0.730 and the radius of the reflector is from 9.0 mm to 52.3 mm. The entrance cone of the LPI collects the low angle, large size beam reflected from the back of the collector while not affecting the small size large angle beam reflected from near the open end of the collector. Both beams then go through the tapered section of the LPI where the cone angles are reduced with each reflection.

The functioning of one type of a PBS is shown in detail in FIG. 4. Light 30 entering the PBS cube 5A is randomly polarized (unpolarized). The reflected beam 31 has an S-polarization, the transmitted beam 32 has a P-polarization. The cube 5A is not a true "cube" in the sense that all of its faces are squares. Its input face 36 and its output faces 37 and 38 have the aspect ratio ½ W:H where W and H are the aspect Width and Height of the LCD panel. For example, faces 36, 37 and 38 have an aspect ratio of 2:3 and dimensions of 12 mm—Width and 18 mm—Height.

The incoming beam 30 is reflected by the coating 35 which is at a 45° angle to the input face 36 of cube 5A. Other angles can be chosen to optimize the effectiveness of a particular coating. The coating 35 reflects the S-component of the beam 30 to form outgoing beam 31 and transmits the P-component of beam 30. The coating 35 may be a multilayer coating formed by laminating alternating coatings of a high refractive material, such as $TiO_2$ and Mgo, and a low refractive material, such as $SiO_2$ and $MgF_2$, on the face of a right-angle prism which is then cemented to another right-angle prism to form the cube 5A. For example, cube 5A may be of BK-7 glass with a one-half wave coating 35 of MgF 632.8 nm. Alternatively, the coating 35 may be a birefringent adhesive layer, for example, an adhesive of liquid-crystalline diacrylate and a polyimide orientation layer (thickness 50 mm) which is rubbed, see European Patent Application 0428-213-A1, incorporated by reference. A suitable cube 5A (cubic polarizer) is described in connection with FIG. 11 of U.S. Pat. No. 5,278,680, and an alternative PBS cube is described at FIG. 2 of U.S. Pat. No. 5,570,209, both incorporated by reference. In this case, the P-polarized transmitted beam 32 is passed through a half-wave retarder plate 33 (polarizer rotator) and rotated 90° to line up with the polarization axis of the reflected S-polarized component. The beam 34, which is transmitted through retarder plate 33, has an S-polarization. A half-wave retarder plate 33 may be a layer which is coated, or cemented, on the face 37 of cube 5A, for example, a birefringent adhesive layer on face 37. For example, the one-half wave retarder plate 33 may be a suitable film on the face of the cube of polyvinyl alcohol, polycarbonate or polystyrene. In principle, one could choose to rotate the S-polarized beam and end up with two P-polarized beams.

In place of cube 5 one may employ a special design of a PBS prism which is a modification of a Glan-Thompson prism. It uses only a thin slab of birefringent material, such as a liquid crystal layer, or a birefringent adhesive layer, between two glass prisms and is disclosed in U.S. Pat. No. 5,601,351 and the DeVaan article (1995) cited above. That prism operates by total internal reflection and is therefore suitable for all visible wavelengths and has a large angular acceptance. The geometry of the PBS is optimized for LCD projection. The functioning of this PBS prism is considerably improved when used in conjunction with the aconic collector/LPI system disclosed in the present patent application. This improvement relates primarily to the aspect of the invention where the two similarly polarized beams recombine. It is more efficient to recombine two rectangular shaped beams rather than two circular beams, as in the system of the DeVaan article.

Generally the LCD panel (FIG. 2) has an aspect ratio of 4:3 (width-to-height). Consequently, the beam from the PBS cube 5A and its mirror 9 of FIG. 2, would have the same aspect ratio of 4:3 and would be rectangular, as shown in FIG. 5. The LPI 3, at its exit pupil 26, has a cross-section which is one-half of the width of the image gate (LCD panel 7). It has an aspect ratio of 2:3; however, it may be slightly larger in width to prevent a gap between the side-by-side beams. A high quality large color LCD panel is 6.4 inches (22.7 cm) diagonal. It has a 4:3 aspect ratio so its dimensions are 5.12" wide and 3.84" high. The exit pupil of the LPI would be 0.84" inches wide and 1.26" high. This exit pupil image is then magnified through the relay optics.

In the embodiment of FIG. 8 the LPI 50 is solid (clear glass or plastic) and is integral with one-half of the cube 5A. It terminates in a 45° face 51, which is coated with the coating of face 36, and a 45° prism 52 adhered thereto. This is a low-cost system, although less efficient than a hollow tube LPI.

The LCD panel may be an active matrix system, a time-division matrix system, a monochrome panel, a three-color or four-color panel or other type of LCD panel using either S or P polarized light.

A problem with the polarizer doubler embodiment of FIGS. 2, 4 and 8 is that the two optical paths of the light, after it exits from the light pipe, are not equal. One path, for example S, will be shorter as it goes directly through the cube 5A of FIG. 2. The other path P will be longer as it is reflected from the mirror 9. This has an adverse effect as the beam with the longer path P will be larger than the beam with the shorter path. The image of the two halves of the light pipe exit will be unequal and consequently will not fit properly into the target area 9 (the LCD plate).

The path lengths are equal in the prism of U.S. Pat. No. 5,601,351, although there will be a loss of light due to the passage of the light through the glass, or plastic prism.

A number of alternative optical systems are presented in FIGS. 9–14 to make path lengths of the two beams equal to each other. These PBS embodiments may be used in conjunction with the light pipe embodiments of FIG. 2 or with other embodiments of light pipes.

Figure 9:
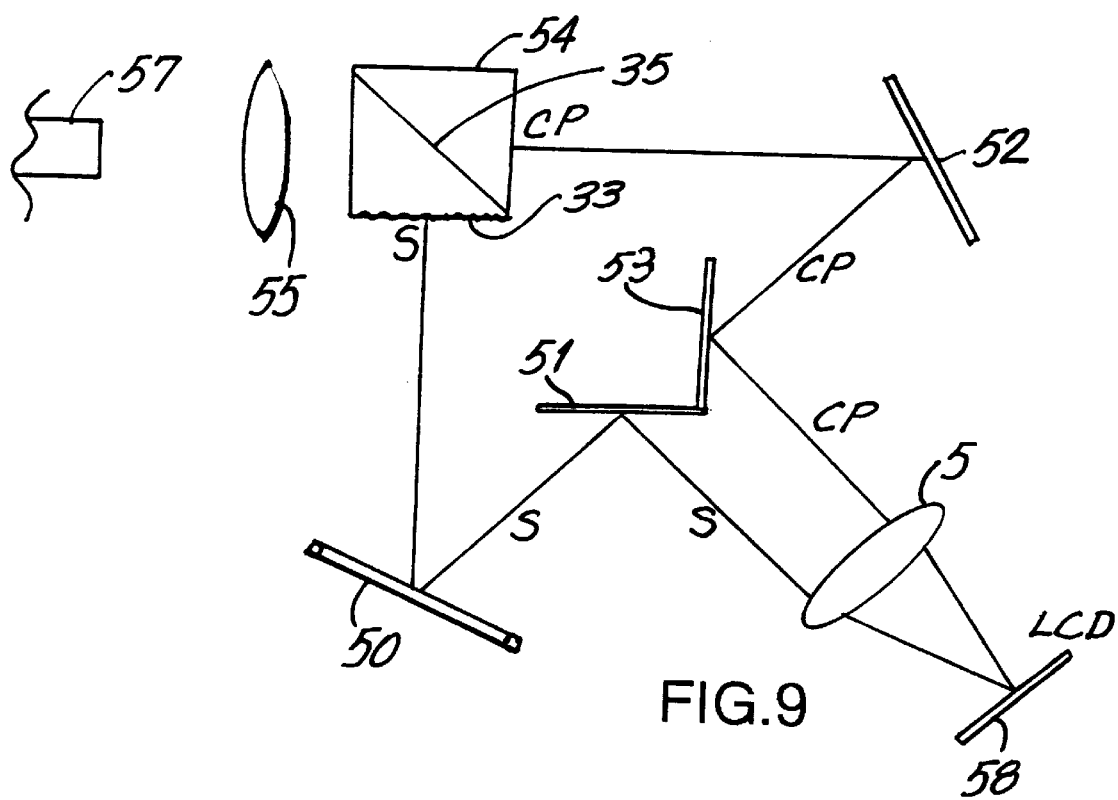
FIG. 9 is a top view showing a PBS (Polarizer Beam Splitter) having equal path lengths for the P and S components and using mirrors.

In the PBS embodiment of FIG. 9 the length of the path of beam S is made longer by reflecting it from several mirrors 50,51. The P beam is converted to S by PBS cube 54 (the converted beam is labeled "CP") and reflected from two mirrors 52,53. The mirror 52, for CP, is closer to the PBS cube 54 than is mirror 50, for path S, making the CP and S paths equal over their entire lengths. This embodiment uses a first relay lens 55, a second relay lens 56, a light pipe 57, an LCD plate 58 and a PBS cube 54 of the type shown in FIG. 4. Unfortunately, the mirrors may increase the size, cost and complexity of the optical system. In addition, in FIG. 9 both beams CP and S have a long path, which may cause the light in both paths to expand beyond the boundaries of the lens apertures, requiring larger lenses.

Figure 10:
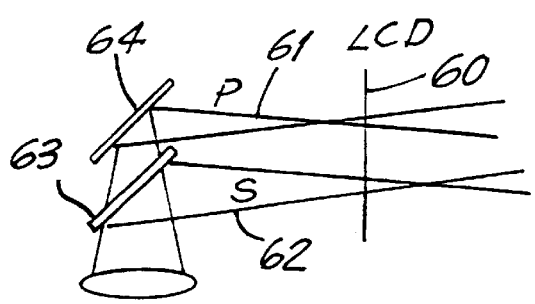
FIG. 10 is a side view of a PBS using different focus points to obtain the effect of equal path lengths for the P and S components.
Figure 11:
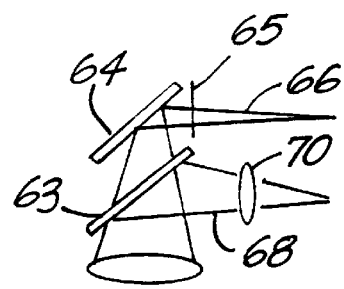
FIG. 11 is a side view of a PBS using a convex lens to obtain the effect of equal path lengths for the P and S components.

In the embodiments of FIGS. 10 and 11 the mirrors are held in air and are not surfaces on a glass cube or prism. The mirror 63 is a coating, like coating 35, but which passes the P beam and reflects the S beam and mirror 64 reflects the S beam through half-wave retarder plate 65.

In the embodiment of FIG. 10, P path 61 and S path 62 are made equal to each other in length by placing the focus of P before the LCD plate 60 and the focus of S after the LCD plate 60.

Figure 12:
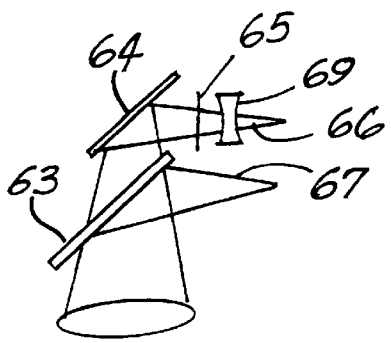
FIG. 12 is a side view of a PBS using a concave-concave mirror to obtain the effect of equal path lengths for the P and S components.

In the embodiment of FIG. 11 a positive lens 70 (convex-convex) is placed in S path 68. In FIG. 12 a negative lens (concave-concave) 69 is placed in P path 66 The lenses 66,67 provide a focus effect which provides the same effective optical effect as equal path lengths for the P and S beams.

In another embodiment (not shown) the angles in the S path are shifted to reduce separation by making a cross-section of the S beam non-round, i.e., an ellipse. This may be accomplished by tilting the mirror in the S path.

Figure 13:
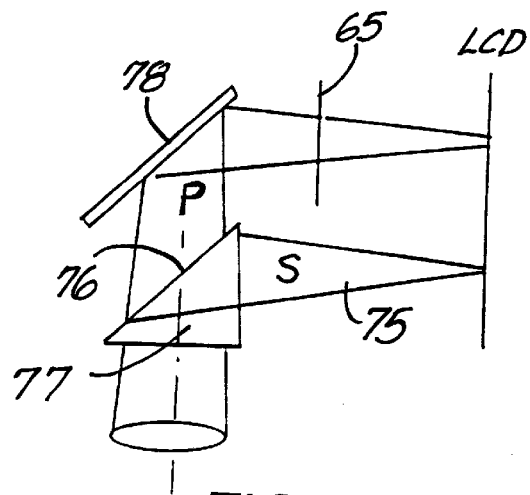
FIG. 13 is a side view of a PBS using a glass prism in one component path to obtain equal path lengths for the P and S components.

In the embodiment of FIG. 13 the P path 75 is shortened by having it pass through glass. The S path is reflected from coating 76, on the top angled surface of glass prism 77. The P path passes through glass prism 78 and is reflected by mirror 78, held in air. The optical path in units of glass is l×M≅l×1.5, which is 0.5 more than in air, e.g., the optical path through glass has the same effective length as a longer measured path through air. The path lengths Z of P and S should be equal, that is: Zp=Zs. If 0.5–2$\mu$ (units), l=2/0.5u= L/u, the amount of glass (width of glass) in the path length Zp would be about 4 cm. The coating 76 (reflects S) and mirror 78 (reflects P) are at 45° angles to the beams S and P and a half-wave plate 65 is in the front of mirror 78 to convert the P beam to an S beam.

Figure 14:
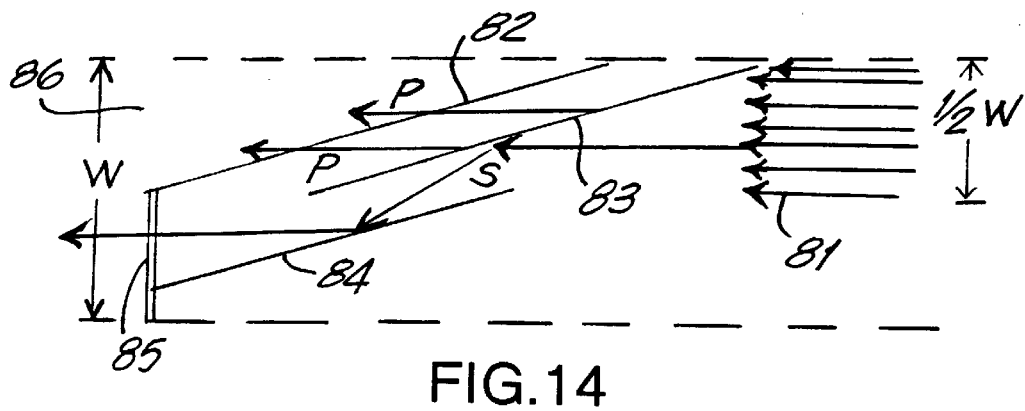
FIG. 14 is a side cross-sectional view of a PBS.

The embodiment of FIG. 14 is the preferred PBS polarizer doubler (polarizing beam splitter). It includes a metal housing which holds the four glass sheets in air. The housing is about 9.7 cm long (back to front), 6 cm wide (W), 4.5 cm high (H), and the PBS is sold by Philips. It divides the incoming unpolarized light beam 81 from the light pipe into two P (or S) beams which exit at the exit face 86 of the housing. The path lengths of the two P beams are practically equal. As shown in FIG. 14 a beam 81 of random polarized light having an aspect ratio of ½ W:H is the incoming beam.

The S component of beam 81 is reflected from the mirrors 82 and 83 which pass the P component. The S component is reflected from the mirror 84 to pass through the one-half wave plate 85 which is held by a metal clip. The P and S components exit the holder face 86 as parallel (upper and lower) bands both with P polarization. The mirrors 82, 83 and 84 are parallel to each other, and they are angled with respect to the exit face 86. The mirrors 82 and 83 are similar to coating 35 (FIG. 4) except they transmit the P component and reflect the S component. The face plate 85 (FIG. 14) is a polarization rotator (half-wave retarder plate) which rotates the S component 90° and converts it into P component.

If the PBS of FIG. 14 is used, then the exit pupil of the light pipe should match its entry face in size (without a relay lens) and in shape (with or without a relay lens). In the case of an aspect ratio of the image gate, i.e., LCD panel of Width:Height ratio of 4:3 the PBS input face (½ W) and light pipe exit pupil will have a 2:3 ratio. For example, the light pipe of FIG. 3 would have an entry pupil which is flat and square (28 mm×28 mm) and an exit pupil which is flat and rectangular (24 mm×18 mm).

What is claimed is:

1. A projector system comprising:

lamp means to generate light;

collector means to gather and re-direct the generated light;

a light pipe having an entrance pupil, an exit pupil, a center section and an optical axis, the light from the collector means being directed on the entrance pupil;

a Liquid Crystal Display (LCD) image forming means to form an image and having an image gate, the exit pupil directing the light on the image gate; and a projector lens;

characterized in that a Polarizing Beam Splitter (PBS) is positioned between the light pipe and the LCD image gate and that the light pipe is hollow, not filled with a dielectric, with mirror walls and tapered in shape with the entrance pupil having an area whose ratio to the area of a cross-section perpendicular to the optical axis of the center section is at least 1.5:1; and wherein the PBS comprises a single rectangular input face having an aspect ratio of ½ W:H and a rectangular output face having an aspect ratio of H:W where W is width and H is height.

2. A projector system comprising:

lamp means to generate light;

collector means to gather and re-direct generated light;

a light pipe having an entrance pupil, an exit pupil, a center section and an optical axis, the light from the collector means being directed on the entrance pupil;

a Liquid Crystal Display (LCD) image forming means to form an image and having an image gate, the exit pupil directing the light on the image gate; and a projector lens;

characterized in that a Polarizing Beam Splitter (PBS) is positioned between the light pipe and the LCD image gate and that the light pipe is hollow, not filled with a dielectric, with mirror walls and tapered in shape with the entrance pupil having an area whose ratio to the area of a cross-section perpendicular to the optical axis of the center section is at least 1.5:1; and wherein the image gate is rectangular and has an aspect ratio of width W to height H (W:H) and the light pipe exit pupil is rectangular with an aspect ratio of W/2:H.

3. A projector system comprising:

lamp means to generate light;

collector means to gather and re-direct the generated light;

a light pipe having an entrance pupil an exit pupil a center section and an optical axis, the light from the collector means being directed on the entrance pupil;

a Liquid Crystal Display (LCD) image forming means to form an image and having an image gate, the exit pupil directing the light on the image gate; and a projector lens;

characterized in that a Polarizing Beam Splitter (PBS) is positioned between the light pipe and the LCD image gate and that the light pipe is hollow, not filled with a dielectric, with mirror walls and tapered in shape with the entrance pupil having an area whose ratio to the area of a cross-section perpendicular to the optical axis of the center section is at least 1.5:1; and wherein the collector means is a reflector with a central axis, mirror internal walls and is a compound reflector having at least two elliptical curves having two different eccentricities and is circular in cross-sections perpendicular to the axis.

4. A projector system as in claim 3 wherein the reflector is curved and concave in shape in profiles through the axis, and the profile curvature comprises at least two ellipses having different eccentricities and both eccentricities are in the range of 0.60–0.90.

5. A projector system comprising:

an elliptical reflector having a central axis, the lamp being positioned at the reflector's axis;

a metal halide arc lamp within the reflector and having an arc gap in the range of 1–6 mm;

a hollow light pipe not filled with dielectric and having an optical axis, an entrance pupil, a rectangular exit pupil, a central section between the entrance and exit pupils, flat mirror interior reflecting walls of low expansion glass, and a tapered shape in which the entrance pupil is at least 50% larger than the area of a cross-section of the central section taken perpendicular to the optical axis;

a cold mirror coating means coating the reflecting walls to reflect visible light and transmit infra-red light;

a LCD (Liquid Crystal Display) panel;

a Polarizing Beam Splitter (PBS) means positioned between the light pipe and the LCD panel to split unpolarized light from the light pipe into P and S polarized beams and to reverse the polarization of either the P or S beams and to combine the two beams side-by-side to form a single beam having one polarization; and a projector lens means to project images formed by the LCD panel onto a screen.

6. A light engine for an optical projector system using a rectangular Liquid Crystal Display (LCD) panel having an aspect ratio of Width:Height (W:H), the light engine comprising:

lamp means to generate light;

collector means to collect and direct the generated light; and a light pipe having an entrance pupil and an exit pupil; characterized in that:

a Polarizing Beam Splitter (PBS) is positioned between the light pipe and the LCD panel; the light pipe exit pupil has a rectangular face and an aspect ratio of W/2:H and the PBS generates a uni-polarized beam which is rectangular in cross-section and having an aspect ratio of W:H.

7. A light engine as in claim 6 wherein the lamp means is a metal halide arc lamp having an arc gap in the range of 1–6 mm.

8. A projector system comprising:

lamp means to generate light;

a compound reflector having an optical axis to gather and direct the generated light;

the reflector having a curvature whose cross-sections through the optical axis are segments of at least two different curves;

a light pipe having an entrance pupil, a rectangular exit pupil reflective internal walls, a center section between the entrance and exit pupils, and an optical axis, the light from the reflector being directed on the entrance pupil, the light pipe being double tapered in shape with the entrance pupil and exit pupil each having a larger area than the area of a cross-section of the center section;

a Liquid Crystal Display (LCD) panel means to form an image and an aspect ratio of W:H;

a Polarizing Beam Splitter (PBS) having a rectangular input face with an aspect ratio of W/2:H positioned between the reflector and the LCD panel means; and a projector lens.

9. A projector system as in claim 8 wherein the lamp means is a plasma arc lamp having an arc gap in the range of 1–6 mm.

10. A projector system as in claim 8 wherein the lamp means is a metal halide arc lamp or an incandescent lamp.

11. A projector system as in claim 9 wherein the two different curves of the reflector are ellipses having two different eccentricities and with two different focal lengths which are ±2 mm from a central focal point.

12. A projector system as in claim 8 wherein the reflector has a mirror internal wall, a back closed end portion having an elliptical curve in profile with a first eccentricity and an open end portion having an elliptical curve in profile with a second eccentricity which is larger than the first eccentricity.

13. A projector system as in claim 8 wherein the light pipe is hollow, without a dielectric filling, and has flat walls of low expansion glass.

14. A projector system as in claim 8 wherein the entrance pupil is square, round or octagonal.

15. A projector system comprising:

(a) a metal halide arc lamp having an arc gap in the range of 1–6 mm;

(b) a reflector having a central axis, the lamp arc gap being along the reflector's axis;

the reflector being circular in cross-sections perpendicular to the central axis and being curved in profile in at least two elliptical curves having different eccentricities;

(c) a light pipe having an entrance pupil, a rectangular exit pupil, a center section between the entrance and exit pupils, an optical axis, and a tapered shape in which the entrance pupil is at least 50% larger than the area of a cross-section of a center section taken perpendicular to the optical axis;

(d) a Polarizing Beam Splitter (PBS) means to receive unpolarized light from the light pipe exit pupil and convert it to uni-polarized light;

(e) a LCD (Liquid Crystal Display) panel illuminated by uni-polarized light transmitted from the PBS; and (f) a projector lens means to project images formed by the LCD panel onto a screen.

16. A projector system as in claim 15 wherein the elliptical curves each have a different focal point.

\* \* \* \* \*